Dec. 30, 1969 ICHIRO WADA 3,486,376
ELECTROMAGNETIC FLOW METER
Filed May 22, 1967  2 Sheets-Sheet 1

INVENTOR.
ICHIRO WADA
BY
Stephen H. Frishauf
Atty

Dec. 30, 1969  ICHIRO WADA  3,486,376
ELECTROMAGNETIC FLOW METER
Filed May 22, 1967  2 Sheets-Sheet 2

United States Patent Office 3,486,376
Patented Dec. 30, 1969

3,486,376
ELECTROMAGNETIC FLOW METER
Ichiro Wada, Yokohama-shi, Japan, assignor to Tokyo Shibaura Electric Co., Ltd., Kawasaki-shi, Japan, a corporation of Japan
Filed May 22, 1967, Ser. No. 640,151
Claims priority, application Japan, May 26, 1966 (utility models), 41/48,466, 41/48,467, 41/48,468, 41/48,470
Int. Cl. G01f 1/00
U.S. Cl. 73—194                 6 Claims

ABSTRACT OF THE DISCLOSURE

A pair of opposing electrodes are mounted to extend through the wall of a conduit of an electromagnetic flow meter with their heads exposed to the fluid flowing through the conduit. The portions at which the other ends of the electrodes and output conductors are connected are hermetically sealed against outside atmosphere.

---

Figure 1:
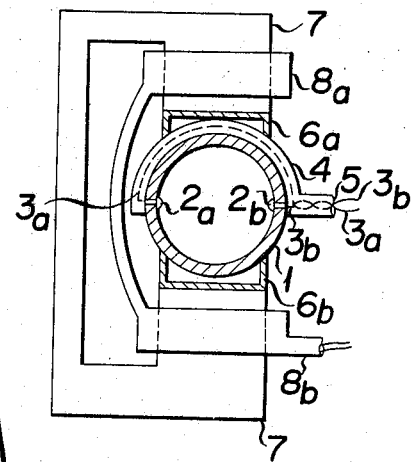

This invention relates to electromagnetic flow meters and more particularly to improvements in the electrode arrangement thereof wherein the electrodes and lead wires or output conductors connected thereto are hermetically sealed against the surrounding atmosphere.

The signal transmitter of the conventional electromagnetic flow meter generally comprises a magnetic field generating device disposed on the outside of a conduit adapted to pass fluids to be measured to create an alternating magnetic field in a direction perpendicular to the flow of said fluid in the conduit to generate a voltage across a pair of electrodes disposed in the conduit corresponding to the flow quantity of the fluid which links the magnetic field in accordance with Faraday's law of electromagnetic induction.

Where the signal transmitter is to be installed outdoors, it is common to house the transmitter in a protection casing and to hermetically seal the space between the inner side of the casing and the outer side of the conduit so as to protect the signal transmitter against the surrounding atmosphere. The purpose of providing such a hermetically sealed casing is to perfectly insulate the electrodes. Provision of such a casing to totally enclose the signal transmitter, however, results in an increase in the physical size and the cost of the signal transmitter. Further, dissipation of heat is prevented.

In a large capacity flow meter, the conduit is often made of laminated paper impregnated with phenol resin. Although such a pipe is generally considered impervious to water, actually a small quantity of water permeates through the wall of the conduit and water vapor thus formed in the casing causes a decrease in the insulating resistance of the laminated pipe and hence the insulating resistance between the pair of electrodes. When the insulation resistance between electrodes decreases below about 200 megohms the minimum value of electric conductivity of the fluid to be measured should be increased. In other words, the measurable range of the electromagnetic flow meter decreases.

Accordingly, in order to provide electromagnetic flow meters of high accuracy, it is important to maintain the insulating resistance between electrodes at a value more than about 200 megohms.

Where the conduit is made of water absorbent material as above described, the portions that must be specially constructed to be air tight are the electrodes and lead wires connected thereto. According to this invention, instead of encasing the complete signal transmitter, the outer ends of the electrodes and lead wires connected thereto are sealed in an air tight fashion against surrounding atmosphere thus enabling the elimination of the casing, thereby decreasing the physical size and manufacturing costs, and further, improving the heat dissipation.

According to this invention it is possible to increase the insulation resistance between electrodes to as high as 20,000 megohms so that the measurable range of the flow meters may be extended to liquids of lower electric conductivity.

This invention may be more clearly understood from the following description taken in connection with the accompanying drawings, in which:

FIG. 1 is a schematic representation of an electromagnetic flow meter embodying this invention; and FIGS. 2 through 7 are sectional views of various modifications of electrodes and associated components to be utilized in the flow meter shown in FIG. 1.

In FIG. 1 an electromagnetic flow meter according to this invention comprises a conduit 1 through which liquid to be metered flows and a pair of diametrically opposed electrodes 2a and 2b are mounted to extend through the wall of the conduit. Inner ends of the electrodes are exposed to contact the fluid in the conduit and the outer ends thereof are connected to lead wires or output conductors 3a and 3b extending through a semi-circular pipe 4 around the conduit, the exit port 5 of the pipe 4 being closed.

A C-shaped magnetic core 7 clamps the conduit 1 between fixtures 6a and 6b. A pair of coils 8a and 8b are wound upon the core to create magnetic flux through the conduit. As can be clearly noted from FIG. 1, since the electrodes 2a and 2b are extending through the wall of the conduit 1 and since lead wires 3a and 3b connected to the electrodes are enclosed in the pipe 4 having sealed exit opening 5, the electrodes and lead wires are hermetically sealed without the necessity of providing a large casing to totally enclose the magnetic flux generating device as in the prior design.

FIGS. 2 through 7 illustrate various embodiments of the construction of different electrode mounting means.

Figure 2:
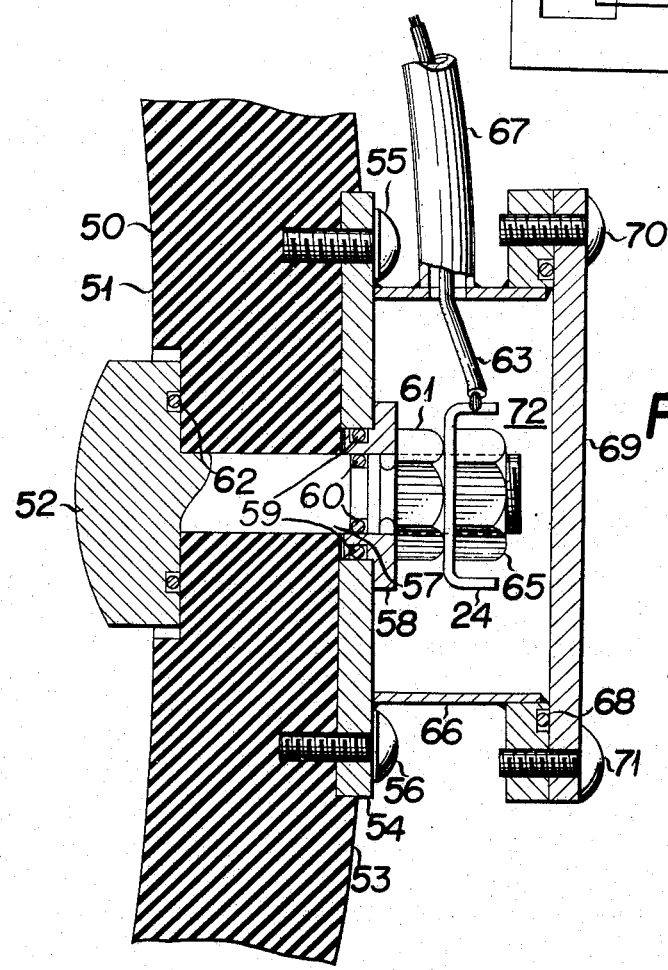

In the embodiment shown in FIG. 2, electrode 57 is provided to extend through the wall of a conduit 50, to expose its enlarged head 52 to the fluid flowing through the conduit. Although it is preferable to make the conduit 50 of a non-water absorbent material, it may also be made of water absorbent materials such as concrete pipe, asbestos pipe, a pipe made of paper impregnated with resinous material, wooden pipe or the like. On the outer surface 53 of the conduit 50 and adjacent to the outer end of the electrode, there is secured a barrier plate 54 by means of screws 55 and 56 which serves to prevent moisture from oozing out of the conduit and to form a portion of a hermetically sealed chamber. An electric insulating bushing 58 is interposed between the electrode 57 and the barrier plate 54 and O-ring packings 59 and 60 are respectively interposed between bushing 58 and barrier plate 54 and between bushing 58 and electrode 57. The electrode 57 is clamped, together with the insulating bushing 58, to the conduit 50 by means of a nut 61 engaging the threaded portion of the electrode 57. If desired a packing 62 may be provided between the electrode head 52 and the inner wall of the conduit. A terminal plate 24 connected to a lead wire 63 is secured to the outer end of the electrode 57 by means of an additional nut 65. A side wall 66 is secured to the barrier plate 54 to surround the electrode and a pipe 67 containing the lead wire 63 is hermetically connected to the side wall 66. The opening of the side wall 66 is hermetically closed by a lid 69 and an O-ring 68 by means of screws 70 and 71.

The air tight chamber 72 defined by the barrier plate 54, side wall 66 and the lid 69 and the air tight pipe 67 serve to hermetically seal the electrode and the lead wire and isolate them from the outer surface of the conduit 50 and the surrounding atmosphere whereby to effectively prevent a decrease in the insulating resistance between a pair of electrodes caused by atmospheric conditions and oozing and leakage of the fluid from the conduit.

Figure 3:
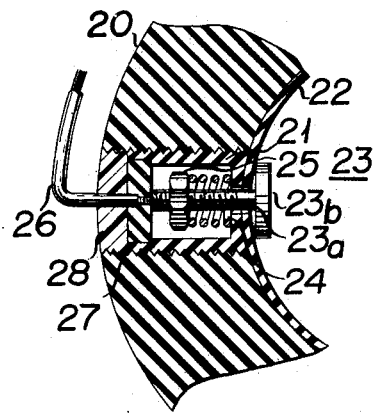

In the modified construction shown in FIG. 3, a conduit 20 is made of metal such as austenitic stainless steel or the like or non-metallic material such as resin and the like. A recessed electrode adapter 21 made of epoxy resin reinforced with glass fiber, for example, is fixed in the wall of the conduit, as by threading. If desired, an anti-corrosive electric insulative lining 22 may be provided on the inner surface of the conduit 20. A threaded electrode 23 is provided to extend through the bottom of the adapter 21 and the lining 22 with its enlarged head 23b exposed to the fluid flowing through the conduit 20, a compression spring 24 or other suitable resilient member is interposed between a nut 25 fixed to the threaded portion 23a of the electrode and the bottom of the adapter to secure the electrode 23, whereby the electrode head 23b is urged against the lining 22 to form a liquid tight joint. In the absence of the lining 22, a rubber packing or the like may be interposed between the electrode head and the electrode adapted. To derive output signals the electrode adapted is electrically connected to the outer end of the electrode and the opening of the electrode adapter 21 is sealed by a packing 27 and a casting compound 28 such as epoxy resin and the like, thus hermetically sealing the electrode 23 in the electrode adapter 21.

Figure 4:
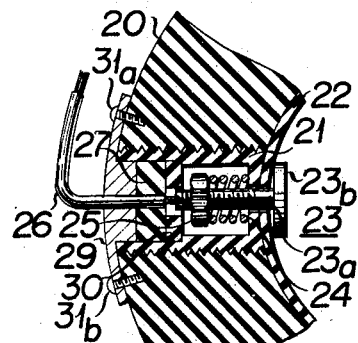

The construction shown in FIG. 4 is substantially identical to that shown in FIG. 3 except that the casting compound 28 is replaced by a metal closure member 29 fixed to the outer surface of the conduit 20. In this case the resilient packing 27 is clamped between the closure member 29 and a stop ring 30 supported by a shoulder of the electrode adapter 21.

Figure 5:
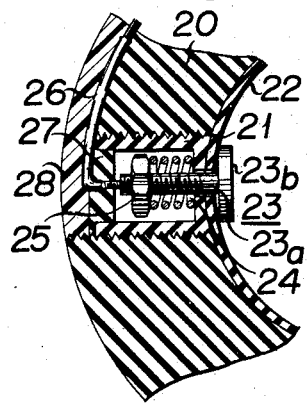

In the modification shown in FIG. 5 the lead wire 26 is received in a groove (not shown) provided on the outer periphery of the conduit 20 and embedded in a casting compound 28 applied onto the outer surface of the conduit. Thus, the lead wire is completely protected against the surrounding atmosphere.

Figure 6:
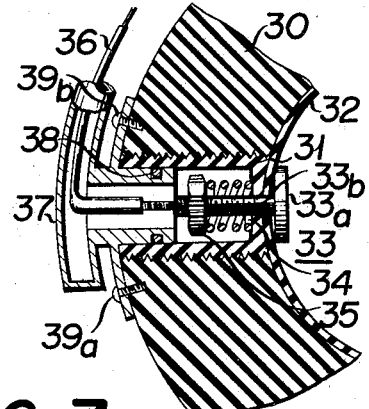

In the modification shown in FIG. 6, the conduit 30 is made of metal such as austenitic stainless steel or non-metallic material such as resin or the like. In cases where metal is used, a cup shaped insulating bushing 31 made of epoxy resin reinforced with glass fiber, for example, is threaded into the wall of the conduit. When desired, an anti-corrosive electric insulating lining 32 may be applied on the inner surface of the conduit. An electrode including a flat enlarged head 33a and a threaded portion 33b is provided to extend through the bottom of the bushing 31 and the lining 32, the head being urged against the lining by means of a compression spring or other suitable resilient means 34 interposed between the bottom wall of the insulating bushing 31 and a nut engaging said threaded portion 33b to form a liquid tight seal. An air tight pipe 37 containing a lead wire 36 connected to the outer end of the electrode is hermetically connected to the insulating bushing 31 by means of an O-ring packing 38. The air tight pipe 37 is secured to the outer surface of the conduit 30 by means of screws 39a and 39b.

Figure 7:
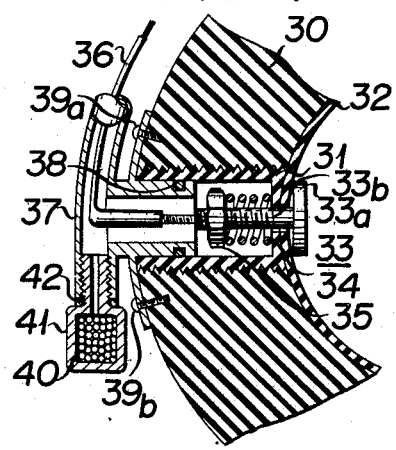

The construction shown in FIG. 7 is substantially the same as that shown in FIG. 6 except that a container 41 containing a desiccating agent such as silica gel or calcium oxide 40 is connected to the lower end of the air tight pipe 37 through a suitable packing 42.

The electrodes according to the present invention are not only applicable for the embodiment shown in FIG. 1 but also in other types of electromagnetic flow meters.

While the invention has been explained by describing particular embodiments thereof, it will be apparent that improvements and modifications may be made without departing from the scope of the invention.

What is claimed is:

1. In an electromagnetic flow meter comprising a conduit adapted to pass a fluid, a magnetic flux generating means to generate an alternating magnetic flux in the direction perpendicular to the direction of flow of said fluid, a pair of electrodes extending through the wall of said conduit, one end of each electrode being exposed to the fluid in said conduit, and hermetically sealed output conductors electrically connected to the outer ends of said electrodes, the improvement comprising:

an air tight chamber to hermetically enclose the portions at which said electrodes and said output conductors are electrically connected, said air tight chamber comprising:

a hollow recessed insulating electrode adapter mounted in the wall of said conduit, one of said electrodes extending into one end of said recessed electrode adapter and being electrically connected to an output conductor within said adapter; and means hermetically sealing the other end of said adapter to said conduit and to said sealed output conductor to hermetically enclose said electrical connection.

2. The flow meter according to claim 1 wherein said adapter sealing means comprises a casting compound sealing said other end of said adapter.

3. The flow meter according to claim 1 wherein said adapter sealing means includes a resilient packing and a metal closure member.

4. The flow meter according to claim 1 wherein said adapter sealing means includes:

a groove providing on the outer periphery of said conduit to receive an output conductor; and a casting compound applied on the outer periphery of said conduit and over said other end of said adapter to embed said conductor in said groove and to hermetically enclose said electrical connection.

5. The flow meter according to claim 1 wherein said adapter sealing means includes an air tight pipe connected to said other end of said electrode adapter by means of an air tight packing, said sealed output conductor passing through said air tight pipe.

6. The flow meter according to claim 5 further comprising a desiccating agent located within said air tight pipe.

References Cited

UNITED STATES PATENTS

| 2,684,401 | 7/1954  | Roeser          | 174—153 |
| 2,766,621 | 10/1956 | Raynsford et al. | 73—194  |

FOREIGN PATENTS

| 1,200,558 | 9/1965 | Germany. |

CHARLES A. RUEHL, Primary Examiner